UNITED STATES PATENT OFFICE.

RICHARD TAGGESELL, OF BUFFALO, NEW YORK, ASSIGNOR TO NATIONAL ANILINE & CHEMICAL COMPANY, INC., OF NEW YORK, N. Y., A CORPORATION OF NEW YORK.

AZO DYES AND PROCESS OF MAKING SAME.

1,327,688.  Specification of Letters Patent.  Patented Jan. 13, 1920.

No Drawing.  Application filed September 6, 1919. Serial No. 322,138.

*To all whom it may concern:*

Be it known that I, RICHARD TAGGESELL, a citizen of the United States, residing at Buffalo, in the county of Erie, State of New York, have invented certain new and useful Improvements in Azo Dyes and Processes of Making Same; and I do hereby declare the following to be a full, clear, and exact description of the invention, such as will enable others skilled in the art to which it appertains to make and use the same.

My invention relates to the production of new azo dyestuffs by combining one molecule of tetrazotized meta-toluenediamin sulfonic acid ($CH_3:NH_2:NH_2:SO_3H:1:2:6:4$) with one molecule of meta-toluenediamin sulfonic acid ($CH_3:NH_2:NH_2:SO_3H:1:2:6:4$), or one molecule of the meta-toluenediamin sulfonic acid obtained by sulfonating meta-toluenediamin $CH_3:NH_2:NH_2:1:2:4$ with fuming sulfuric acid and combining the intermediate product thus obtained of the formula:

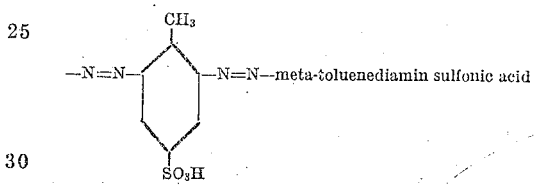

with a suitable unsulfonated compound.

It has heretofore been proposed to make azo dyestuffs by combining tetrazotized meta-toluenediamin sulfonic acid with two molecules of an amin or of a diamin, such as nitro-phenylenediamin or beta-naphthylamin, but such dyestuffs have only a limited solubility. It has also been proposed to combine tetraotized meta-toluenediamin sulfonic acid with two molecules of a meta-diamin and, by the further operation of subjecting the intermediate dyestuffs thus obtained to an after treatment with two molecules of a diazotized aromatic sulfonic acid, to produce a dyestuff of a sufficient degree of solubility.

The new dyestuffs forming the subject matter of the present invention, which contain a second sulfonic acid group, possesses not only a very satisfactory degree of solubility, but also a very remarkable affinity for the vegetable fiber, which insures their fastness to washing.

A further distinct difference and advantage of the dyestuffs of the present invention, as compared with the dyestuffs above mentioned, is that the dyestuffs above mentioned contain as components bodies which either are not able to take up another diazo compound or have already been treated with a diazo compound, in other words, these dyestuffs are not capable of after treatment on the fiber with diazo compounds; while the dyestuffs of the present invention, on the other hand, containing as a component one of the two meta-toluenediamin sulfonic acids mentioned, either of which is capable of taking up two diazo compounds, can be subjected to after-treatment with diazo compounds on the fiber. This property is increased in the new dyestuffs, if the second component is also one able to take up two diazo compounds, this second component being, for instance, meta-phenylenediamin, meta-toluenediamin, meta-amido-phenol, etc.

The dyestuffs forming the subject matter of the present invention are dark powders, soluble in water, and dyeing cotton from a salt bath in orange-brown to reddish-brown shades of great intensity. They correspond to the general formula:

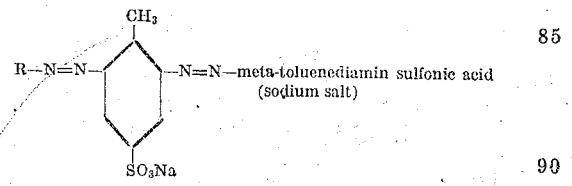

"R" standing for the residue of an unsulfonated aromatic component, such as meta-phenylenediamin, or the like.

On treatment with diazo compounds (preferably diazotized nitranilin) on the fiber, the shades are darkened and intensified, and the dyeings made practically absolutely fast to washing.

While the development of certain azo dyestuffs on the fiber is well known in the dyestuff art, nevertheless I consider that the developed colors, produced by developing the new dyestuffs on the fiber, are likewise new, and that these developed colors, as well as the colors produced by dyeing with the new dyestuffs without developing, form a part of the present invention.

In carrying out my invention in a practical way, I proceed as follows (parts being by weight):

202 parts of meta-toluenediamin sulfonic acid ($CH_3:NH_2:NH_2:SO_3H, 1:2:6:4$) are tetrazotized in the well known manner with 500 parts of hydrochloric acid of 20° Bé. and 138 parts of sodium nitrite. To the ice cold tetrazo solution is added, while constantly stirring, a solution of 224 parts of the sodium salt of meta-toluenediamin sulfonic acid (obtained by sulfonating meta-toluenediamin with fuming sulfuric acid.) After about six hours stirring the intermediate product will be finished. This reaction may be accelerated by neutralizing almost completely the free mineral acid present by carefully adding soda carbonate. When the intermediate product is finished, a solution of 108 parts of meta-phenylenediamin is added, and after 24 hours stirring the mixture is made alkaline with soda carbonate, boiled up, salted out, and the precipitated dyestuff filtered, pressed and dried.

The new dyestuff represents, when ground, a dark powder, easily soluble in hot water with a brown color. It dyes unmordanted cotton from a salt bath bright orange-brown shades of good fastness. When "developed" on the fiber with diazotized para-nitranilin the shade changes to a dark brown of almost absolute fastness to washing.

In the example given the meta-toluenediamin sulfonic acid, obtained by sulfonating meta-toluenediamin ($CH_3:NH_2:NH_2:1:2:4$) with fuming sulfuric acid, may be replaced by meta-toluenediamin sulfonic acid, $CH_3:NH_2:NH_2:SO_3H, 1:2:6:4$; while the meta-phenylenediamin may be replaced by the following: meta-toluenediamin, nitro-meta-phenylenediamin, nitro-meta-toluenediamin, chlor-meta-phenylenediamin ($Cl:NH_2:NH_2:1:2:4$), meta-amido-phenyl, alpha-naphthylamin or beta-naphthylamin, to give dye-stuffs of a very similar character.

I claim:

1. The method of producing new azo dyestuffs, which comprises combining one molecule of tetrazotized meta-toluenediamin sulfonic acid, $CH_3:NH_2:NH_2:SO_3H, 1:2:6:4$, with one molecule of a meta toluenediamin sulfonic acid, and combining the resulting intermediate product with a suitable unsulfonated compound, substantially as described.

2. The herein described new azo dyestuffs derived from one molecule of the tetrazo compound of meta-toluenediamin sulfonic acid ($CH_3:NH_2:NH_2:SO_3H, 1:2:6:4$), one molecule of a meta-toluenediamin sulfonic acid and one molecule of a suitable unsulfonated compound, said dyestuffs, in the form of their sodium salts, corresponding to the general formula:

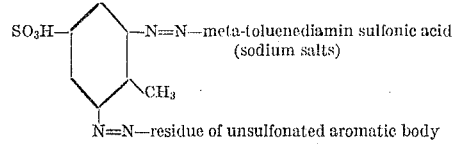

representing dark powders, easily soluble in hot water with a brown color, dyeing unmordanted cotton brown shades of great fastness, these shades on "developing" on the fiber with diazotized para-nitranilin turning into dark brown shades of almost absolute fastness to washing, substantially as described.

3. The herein described dyed fibers, dyed with the herein described new dyestuffs derived from one molecule of the tetrazo compound of meta-toluenediamin sulfonic acid ($CH_3:NH_2:NH_2:SO_3H, 1:2:6:4$), one molecule of a meta-toluenediamin sulfonic acid and one molecule of a suitable unsulfonated compound, said dyestuffs corresponding to the general formula:

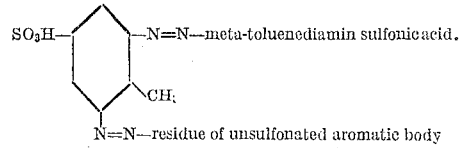

said dyed fibers representing brown shades of great fastness.

In testimony whereof I affix my signature.

RICHARD TAGGESELL.